2,739,977
DIALKYL PHOSPHORYL MONOCHLORIDES

Harry R. Gamrath and Roger E. Hatton, St. Louis, Mo., assignors to Monsanto Chemical Company, St. Louis, Mo., a corporation of Delaware No Drawing. Application November 6, 1950,
Serial No. 194,371

17 Claims. (Cl. 260—461)

This invention relates to certain novel dialkyl phosphoryl monochlorides having the formula

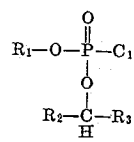

wherein $R_1$ represents an alkyl radical preferably containing from 1 to 18 carbon atoms in which there are at least 2 hydrogen substituents on the carbon atom bonded to the phosphate radical, and $R_2$ and $R_3$ represent alkyl radicals and preferably alkyl radicals which together contain not more than 17 carbon atoms. This invention also relates to a process for the preparation of the above described dialkyl phosphoryl monochlorides.

The dialkyl phosphoryl monochlorides of this invention have been found to possess exceptional utility in a wide variety of applications. They may be converted to the ortho-phosphate esters which are useful as plasticizers, functional fluids or paint removers. The dialkyl phosphoryl monochlorides may be reacted with amines to produce compounds having exceptional utility as corrosion inhibitors. The novel compounds of this invention may also be hydrolyzed with water to form compounds extremely useful as textile treating compounds.

The novel dialkyl phosphoryl monochlorides of this invention may be prepared by reacting phosphorus oxychloride and a primary alkyl alcohol preferably containing from 1 to 18 carbon atoms to form the monoalkyl phosphoryl dichloride, and then reacting the monoalkyl phosphoryl dichloride thus formed with a secondary alkyl alcohol preferably containing from 3 to 18 carbon atoms to form the dialkyl phosphoryl monochloride.

The following examples are illustrative, but not limitative of the novel compounds of this invention and their manner of preparation:

EXAMPLE I

*n-Butyl sec-tetradecyl phosphoryl monochloride*

A round-bottom, three-neck flask, fitted with a stirrer, thermometer, a dropping funnel and an exhaust vent is charged with 76.7 g. of phosphorus oxychloride. The phosphorus oxychloride is cooled below 15° C., and with constant agitation, 37.1 g. of n-butanol are added dropwise, keeping the reaction mass temperature at about 10°–15° C. After all of the n-butanol is charged, agitation of the reaction mixture is continued and the mass temperature allowed to rise to about 25° C. During this agitation period, gaseous hydrochloric acid is evolved. The last traces of gaseous hydrogen chloride are then removed by the gradual application of reduced pressure to the reaction vessel until an absolute pressure of 50 mm. Hg is attained at a temperature of 25° C. under which conditions the reaction vessel is maintained until essentially all of the gaseous hydrogen chloride is removed. The vacuum is then released and the reaction mass is cooled to about 15° C. 107.2 g. of sec-tetradecanol are then added drop-wise to the n-butyl phosphoryl dichloride with constant agitation while maintaining a reaction temperature between 10°–15° C. The sec-tetradecanol used is the 7-ethyl-2-methyl-4-undecanol. After all of the sec-tetradecanol is charged, the mass is allowed to warm to 25° C. Thereafter the reaction mass is placed under a reduced pressure of 10–20 mm. Hg absolute. The reaction mass is then stirred until a chlorine analysis of the reaction mass indicates not more than 1.1 gram-atoms chlorine for each mol of phosphorus oxychloride charged. A 40–60 hour stirring period is generally required to reduce the chlorine content of the reaction mixture to this point.

The resultant n-butyl sec-tetradecylphosphoryl monochloride is obtained in essentially a quantitative yield having a specific gravity at 25°/25° C. of 0.9886.

EXAMPLE II

*2-ethylhexyl sec-butyl phosphoryl monochloride*

In accordance with the procedure described in Example I, 2-ethylhexyl sec-butyl phosphoryl monochloride is prepared utilizing the following reactants:

| | G. |
|---|---|
| Phosphorus oxychloride | 153.4 |
| 2-ethylhexanol | 130.2 |
| Sec-butanol | 81.5 |

The weight yield of 2-ethylhexyl sec-butyl phosphoryl monochloride obtained is essentially quantitative. At 25°/25° C., the specific gravity of the material is 1.0458.

Analysis:

| | Chlorine, percent |
|---|---|
| Calculated for $C_{12}H_{26}O_3ClP$ | 12.5 |
| Found | 13.6 |

EXAMPLE III

*2-ethylhexyl capryl phosphoryl monochloride*

In accordance with the procedure described in Example I, 2-ethylhexyl capryl phosphoryl monochloride is prepared utilizing the following reactants:

| | G. |
|---|---|
| Phosphorus oxychloride | 306.8 |
| 2-ethylhexanol | 260.4 |
| Capryl alcohol | 325.5 |

The weight yield of 2-ethylhexyl capryl phosphoryl monochloride obtained is essentially quantitative. The specific gravity of the mass is 0.9724 at 25°/25° C.

Analysis:

| | Chlorine, percent |
|---|---|
| Calculated for $C_{16}H_{34}O_3ClP$ | 10.4 |
| Found | 9.4 |

EXAMPLE IV

*Methyl capryl phosphoryl monochloride*

In accordance with the procedure described in Example I, methyl capryl phosphoryl monochloride is prepared utilizing the following reactants:

| | G. |
|---|---|
| Phosphorus oxychloride | 153.4 |
| Methyl alcohol | 32.0 |
| Capryl alcohol | 162.5 |

The weight yield of methyl capryl phosphoryl monochloride is essentially quantitative.

EXAMPLE V

*n-Hexadecyl isopropyl phosphoryl monochloride*

In accordance with the procedure described in Example I, n-hexadecyl isopropyl phosphoryl monochloride is prepared utilizing the following reactants:

| | G. |
|---|---|
| Phosphorus oxychloride | 153.4 |
| n-Hexadecanol | 242.4 |
| Isopropanol | 66.1 |

From these charges, the weight yield of n-hexadecyl isopropyl phosphoryl monochloride obtained is essentially quantitative. The specific gravity of the mass is 0.9713 at 25°/25° C.

Analysis:                                   Chlorine, percent
    Calculated for $C_{19}H_{40}O_3ClP$ _____ 9.3
    Found _____ 9.1

EXAMPLE VI

*n-Hexadecyl sec-tetradecyl phosphoryl monochloride*

In accordance with the procedure described in Example I, n-hexadecyl sec-tetradecyl phosphoryl monochloride is prepared utilizing the following reactants:

| | G. |
|---|---|
| Phosphorus oxychloride | 153.4 |
| n-Hexadecyl alcohol | 242.4 |
| Sec-tetradecyl alcohol | 214.2 |

The secondary tetradecyl alcohol used in this example is 7-ethyl-2-methyl-4-undecanol. The weight yield of n-hexadecyl sec-tetradecyl phosphoryl monochloride is essentially quantitative.

While specific quantities, temperatures and reaction conditions have been set forth in the preceding examples, it is not intended that this invention be restricted solely thereto, as to a certain degree these quantities, temperatures and reaction conditions may be subject to variation. In the preparation of these novel dialkyl phosphoryl monochlorides, it is essential that the phosphorus oxychloride be reacted first with the primary alcohol to form the monoalkyl phosphoryl dichloride inasmuch as secondary alcohols do not satisfactorily react with $POCl_3$ to form a monoalkyl phosphoryl dichloride. The secondary alcohols will, however, react with a monoalkyl phosphoryl dichloride to form a dialkyl phosphoryl chloride. Any of the various procedures well known to those skilled in the art may be utilized for the preparation of the alkyl phosphoryl dichloride. A particularly advantageous method of preparation is by the reaction of $POCl_3$ and a primary alkyl alcohol. If such a reaction is utilized, it is preferred that approximately equimolecular proportions of the reactants be utilized. In the case of the lower alcohols, i. e., those containing from 1 to 5 carbon atoms, a slight excess of the alcohol may be utilized, if desired, and the alkyl phosphoryl dichloride purified by distillation. In the case of the higher aliphatic alcohols, i. e., those containing more than 5 carbon atoms, approximately equimolecular proportions of the reactants are particularly satisfactory inasmuch as the reaction is essentially quantitative and purification by distillation under commercially practical temperatures and pressures is not feasible due to the decomposition of the monoalkyl phosphoryl dichloride.

The temperature at which the reaction between the primary alcohol and the phosphorus oxychloride is carried out is governed principally by the freezing point of the phosphorus oxychloride and the color of the finished product desired. Since phosphorus oxychloride crystallizes at approximately 2° C., initial reaction temperatures below 2° C. are not practical. Once the reaction is begun, the temperature may then be reduced below 2° C. as the alcohol added and the alkyl phosphoryl dichloride formed depress the crystallizing point of the mass so that lower temperatures may be maintained. As the temperature of the reaction is increased greater than 25° C., the color of the monoalkyl phosphoryl dichloride is increased resulting in more highly colored phosphate esters subsequently prepared from the dialkyl phosphoryl monochlorides. In the case of the lower alkyl phosphoryl dichlorides, such as methyl phosphoryl dichloride, it is preferred that the temperature be maintained below about 5° C. in order to keep the formation of methyl chloride to a minimum. It is, therefore, preferred that this reaction for the formation of monoalkyl phosphoryl dichlorides be carried out at a temperature not in excess of about 25° C. After the reaction is substantially complete, however, the temperature may be increased to a maximum of 50° C. to facilitate the removal of the hydrogen chloride gas evolved in the reaction.

It is preferred in this reaction that the alcohol be added to the $POCl_3$. While the reverse order of addition of reactants may be utilized, such a reverse order promotes the formation of the dialkyl phosphoryl chloride and trialkyl phosphate ester, thereby affecting the purity of the final product.

The reaction between the secondary aliphatic alcohol and the monoalkyl phosphoryl dichloride prepared as described above proceeds at a much slower rate than does the preparation of the monoalkyl phosphoryl dichloride. In this reaction it is preferred that at least a one molecular proportion of the secondary alcohol be utilized for each one molecular proportion of the monoalkyl phosphoryl dichloride. Particularly advantageous results are obtained when from 1.0 to about 1.5 molecular proportions of the secondary aliphatic alcohol are utilized for each one molecular proportion of the monoalkyl phosphoryl dichloride. The temperature maintained during this reaction may be varied over a substantial range, such as in the range of from about —10° C. to about 50° C. Preferably, however, the reaction temperature is maintained in the range of from about 0° C. to about 25° C.

During both of the above described reactions, hydrogen chloride gas is evolved and this gas may be removed by any method which is particularly convenient. Thus, the hydrogen chloride gas may be removed by merely allowing it to escape naturally, by blowing the reaction mixture with air or by keeping the reaction mixture under reduced pressure, with the latter method being preferred. In the first step of this process, i. e., in the preparation of monoalkyl phosphoryl dichloride, secession of the evolution of hydrogen chloride gas is an indication of the end of the reaction. In the second step of this process, i. e., the formation of the dialkyl phosphoryl chloride, the end of the reaction may be determined by the chlorine content of the reaction mixture, stopping the reaction when analysis shows that the reaction mixture contains from about 0.95 to about 1.10 gram-atoms of chlorine per mol of phosphorus oxychloride charged initially.

While the use of unsubstituted primary alkyl alcohols containing from 1 to 18 carbon atoms and unsubstituted secondary alkyl alcohols containing from 3 to 18 carbon atoms constitutes a preferred embodiment of this invention, the primary and secondary alkyl alcohols may be substituted with one or more unreactive, from the standpoint of this process, substituents. Thus, the alcohol may be substituted with nitro groups, aryl groups, such as phenyl, alkoxy groups, such as ethoxy, butoxy, isopropoxy-propoxy, etc., halogens, such as chlorine, bromine, iodine and fluorine.

What is claimed is:

1. As new chemical compounds, dialkyl phosphoryl monochlorides having the formula

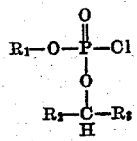

wherein $R_1$ represents the 2-ethylhexyl radical, $R_2$ represents the methyl radical, and $R_3$ represents an alkyl radical containing 2 to 6 carbon atoms.

2. As new chemical compounds, dialkyl phosphoryl monochlorides having the formula

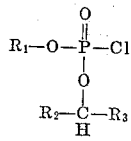

wherein $R_1$ represents an alkyl radical containing from 1 to 18 carbon atoms in which there are at least 2 hydrogen substituents on the carbon atom bonded to the phosphate radical, $R_2$ represents the methyl radical and $R_3$ represents an alkyl radical containing 1 to 6 carbon atoms.

3. n-Butyl sec-tetradecyl phosphoryl monochloride.
4. 2-ethylhexyl sec-butyl phosphoryl monochloride.
5. 2-ethylhexyl capryl phosphoryl monochloride.
6. Methyl capryl phosphoryl monochloride.
7. n-Hexadecyl isopropyl phosphoryl monochloride.

8. A process for the preparation of dialkyl phosphoryl monochlorides having the formula

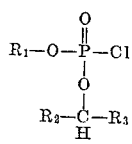

wherein $R_1$ represents an alkyl radical in which there are at least 2 hydrogen substituents on the carbon atom bonded to the phosphate radical, and $R_2$ and $R_3$ represent alkyl radicals, which comprises reacting a monoalkyl phosphoryl dichloride wherein the alkyl group is derived from a primary alkyl alcohol and a secondary alcohol.

9. A process for the preparation of dialkyl phosphoryl monochlorides having the formula

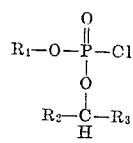

wherein $R_1$ represents an alkyl radical containing from 1 to 18 carbon atoms in which there are at least 2 hydrogen substituents on the carbon atom bonded to the phosphate radical, and $R_2$ and $R_3$ represent alkyl radicals which together contain not more than 17 carbon atoms, which comprises reacting a monoalkyl phosphoryl dichloride wherein the alkyl group is derived from a primary alkyl alcohol containing from 1 to 18 carbon atoms and a secondary alcohol containing from 3 to 18 carbon atoms.

10. A process for the preparation of dialkyl phosphoryl monochlorides having the formula

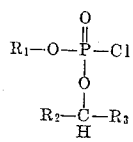

wherein $R_1$ represents an alkyl radical in which there are at least 2 hydrogen substituents on the carbon atom bonded to the phosphate radical, and $R_2$ and $R_3$ represent alkyl radicals, the step comprising reacting phosphorus oxychloride and a primary alkyl alcohol to form a monoalkyl phosphoryl dichloride, reacting the monoalkyl phosphoryl dichloride thus formed with a secondary alkyl alcohol.

11. A process for the preparation of dialkyl phosphoryl monochlorides having the formula

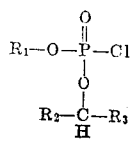

wherein $R_1$ represents an alkyl radical containing from 1 to 18 carbon atoms in which there are at least 2 hydrogen substituents on the carbon atom bonded to the phosphate radical, and $R_2$ and $R_3$ represent alkyl radicals which together contain not more than 17 carbon atoms, the step comprising reacting phosphorus oxychloride and a primary alkyl alcohol containing from 1 to 18 carbon atoms to form a monoalkyl phosphoryl dichloride, reacting the monoalkyl phosphoryl dichloride thus formed with a secondary alkyl alcohol containing from 3 to 18 carbon atoms.

12. A process for the preparation of dialkyl phosphoryl monochlorides having the formula

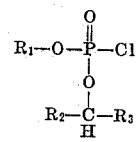

wherein $R_1$ represents an alkyl radical containing from 1 to 18 carbon atoms in which there are at least 2 hydrogen substituents on the carbon atom bonded to the phosphate radical, and $R_2$ and $R_3$ represent alkyl radicals which together contain not more than 17 carbon atoms, the steps comprising reacting phosphorus oxychloride and a primary alkyl alcohol containing from 1 to 18 carbon atoms while maintaining a reaction temperature in the range of from about $+2°$ C. to about $+25°$ C. until the reaction between the primary alcohol and the phosphorus oxychloride is substantially complete, and while removing the hydrogen chloride formed, and thereafter continuing the removal of the hydrogen chloride formed at a temperature not exceeding about $50°$ C., to form a monoalkyl phosphoryl dichloride, reacting the monoalkyl phosphoryl dichloride with a secondary alkyl alcohol containing from 3 to 18 carbon atoms, while maintaining a temperature in the range of from about $-10°$ C. to about $50°$ C. and while removing the hydrogen chloride formed.

13. In a process for the preparation of n-butyl sec-tetradecyl phosphoryl monochloride, the steps comprising reacting phosphorus oxychloride and n-butyl alcohol while maintaining a reaction temperature in the range of from about $+2°$ C. to about $+25°$ C. until the reaction between the alcohol and the phosphorus oxychloride is substantially complete, and while removing the hydrogen chloride formed, and thereafter continuing the removal of the hydrogen chloride formed at a temperature not exceeding about $50°$ C. to form n-butyl phosphoryl dichloride, and reacting the n-butyl phosphoryl dichloride with sec-tetradecyl alcohol while maintaining a temperature in the range of from about $-10°$ C. to about $50°$ C., and while removing the hydrogen chloride formed.

14. In a process for the preparation of 2-ethylhexyl sec-butyl phosphoryl monochloride, the steps comprising reacting phosphorus oxychloride and 2-ethylhexyl alcohol while maintaining a reaction temperature in the range of from about $+2°$ C. to about $+25°$ C. until the reaction between the alcohol and the phosphorus oxychloride is substantially complete, and while removing the hydrogen chloride formed, and thereafter continuing the removal of the hydrogen chloride formed at a temperature not exceeding about $50°$ C. to form 2-ethylhexyl phosphoryl dichloride, and reacting the 2-ethylhexyl phosphoryl dichloride with sec-butyl alcohol while maintaining a temperature in the range of from about $-10°$ C. to about $50°$ C., and while removing the hydrogen chloride formed.

15. In a process for the preparation of 2-ethylhexyl capryl phosphoryl monochloride, the steps comprising reacting phosphorus oxychloride and 2-ethylhexyl alcohol while maintaining a reaction temperature in the range of from about $+2°$ C. to about $+25°$ C. until the reaction between the alcohol and the phosphorus oxychloride is substantially complete, and while removing the hydrogen chloride formed, and thereafter continuing the removal of the hydrogen chloride formed at a temperature not exceeding about 50° C. to form 2-ethylhexyl phosphoryl dichloride, and reacting the 2-ethylhexyl phosphoryl dichloride with capryl alcohol while maintaining a temperature in the range of from about −10° C. to about 50° C., and while removing the hydrogen chloride formed.

16. In a process for the preparation of methyl capryl phosphoryl monochloride, the steps comprising reacting phosphorus oxychloride and methyl alcohol while maintaining a reaction temperature in the range of from about +2° C. to about +25° C. until the reaction between the alcohol and the phosphorus oxychloride is substantially complete, and while removing the hydrogen chloride formed at a temperature not exceeding about 50° C. to form methyl phosphoryl dichloride, and reacting the methyl phosphoryl dichloride with capryl alcohol while maintaining a temperature in the range of from about −10° C. to about 50° C., and while removing the hydrogen chloride formed.

17. In a process for the preparation of n-hexadecyl isopropyl phosphoryl monochloride, the steps comprising reacting phosphorus oxychloride and n-hexadecyl alchohol while maintaining a reaction temperature in the range of from about +2° C. to about +25° C. until the reaction between the alcohol and the phosphorus oxychloride is substantially complete, and while removing the hydrogen chloride formed at a temperature not exceeding about 50° C. to form n-hexadecyl phosphoryl dichloride, and reacting the n-hexadecyl phosphoryl dichloride with isopropyl alcohol while maintaining a temperature in the range of from about −10° C. to about 50° C., and while removing the hydrogen chloride formed.

References Cited in the file of this patent

UNITED STATES PATENTS

| | | |
|---|---|---|
| 1,844,408 | Nicolai | Feb. 9, 1932 |
| 2,005,619 | Graves | June 18, 1935 |
| 2,033,918 | Britton | Mar. 17, 1936 |
| 2,520,393 | Fletcher | Aug. 29, 1950 |

OTHER REFERENCES

Morel: Bull. Soc. Chim. (3rd series), vol. 21, pp. 491–497 (1899).

Saunders et al.: J. Chem. Soc. (1948), pp. 699–703.